Figure 5:
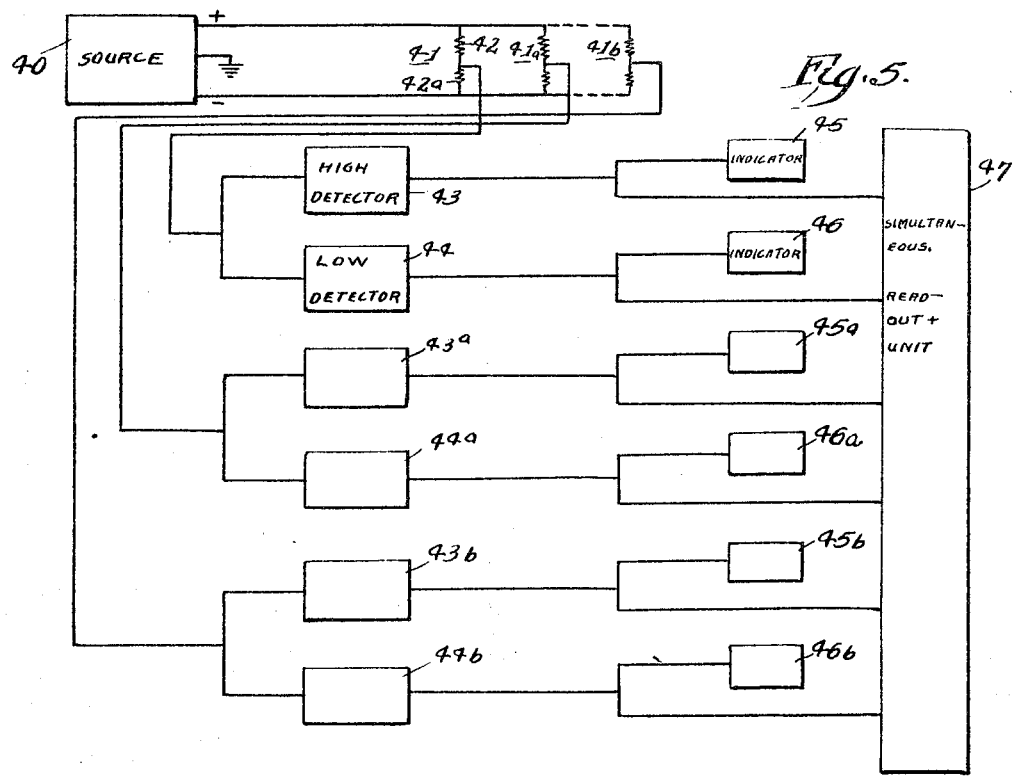

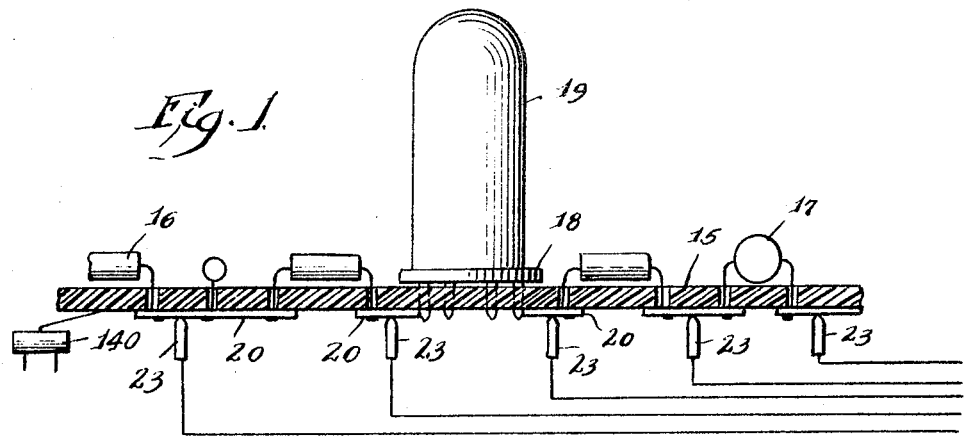
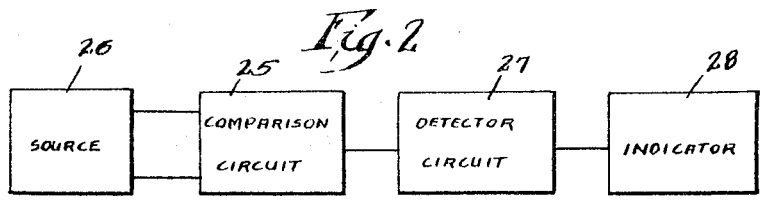
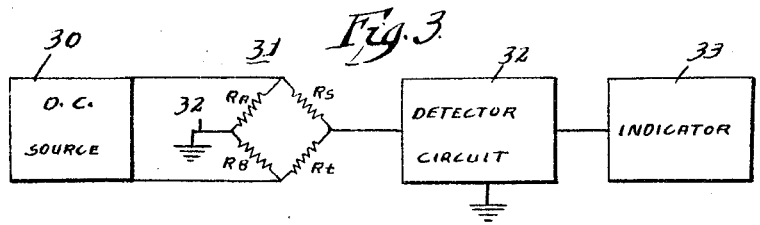
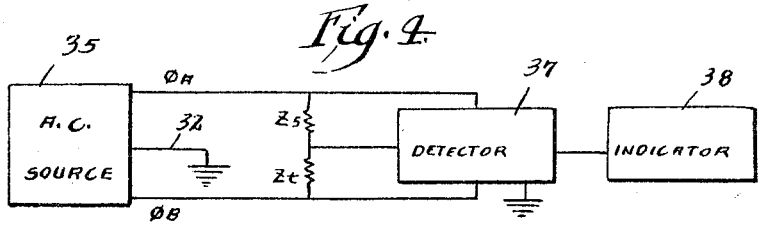
Inventors.
James M. Brown.
Owen C. Slater.
Paul V. Tollefson
By Hofgren, Brady,
Wegner, Allen & Stellman
Attorneys.

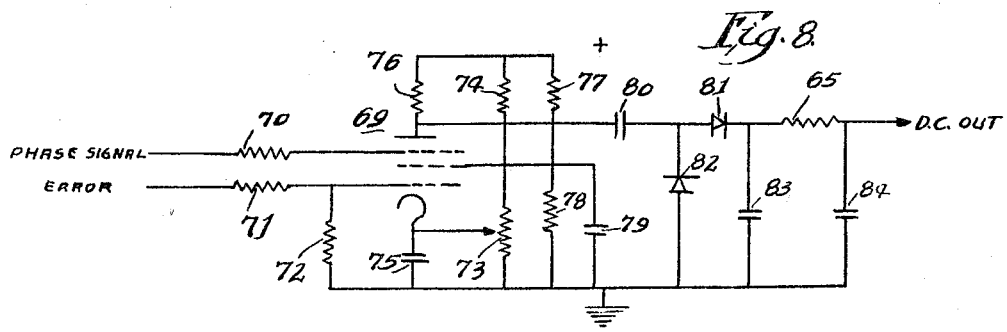
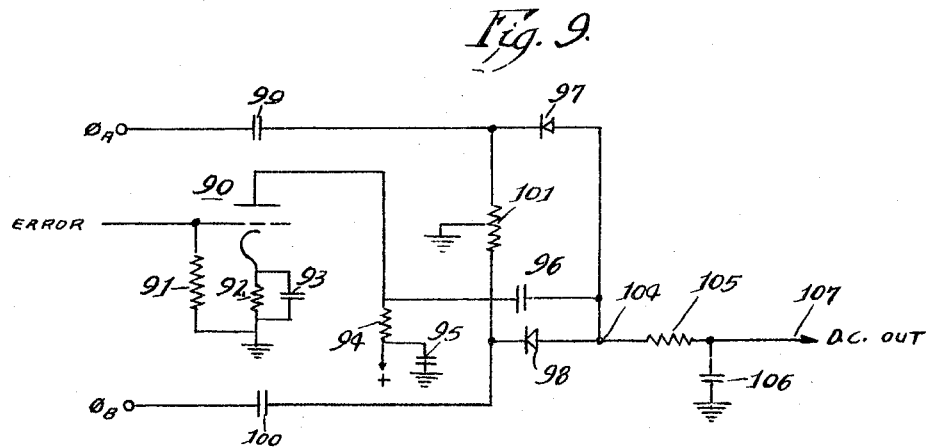
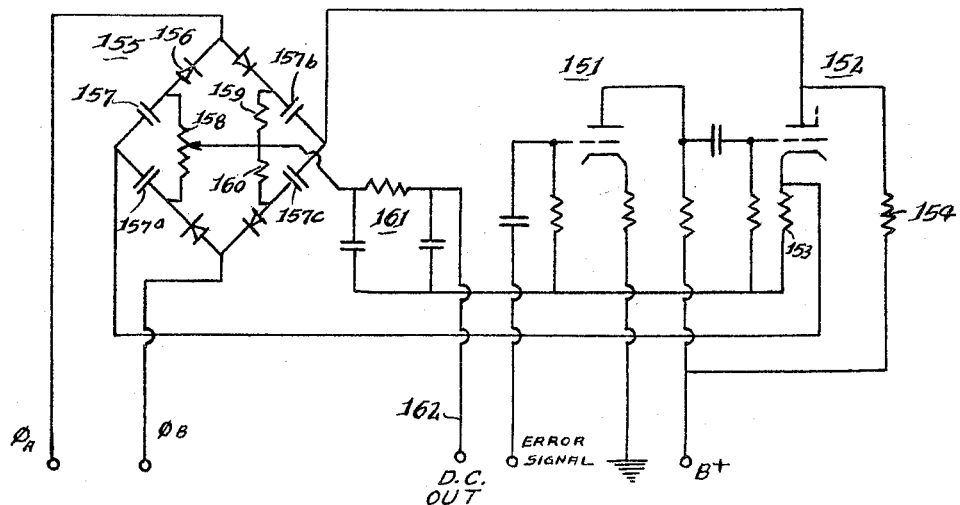

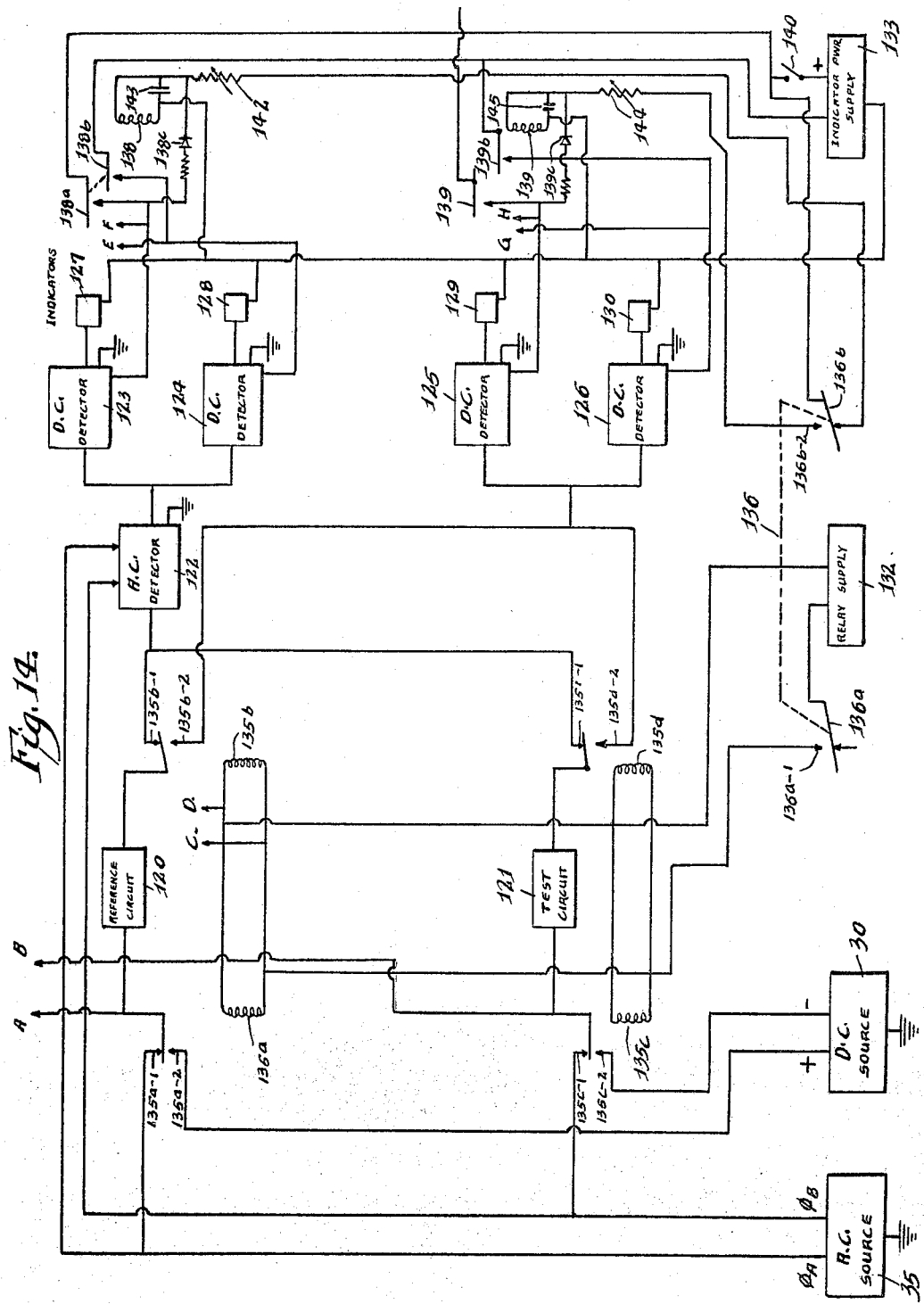

United States Patent Office 3,264,562
Patented August 2, 1966

3,264,562
PLURAL BRIDGE SYSTEM FOR SIMULTANEOUSLY TESTING A PLURALITY OF INTERCONNECTED CIRCUIT ELEMENTS
James M. Brown, Waukegan, Ill., and Owen C. Slater, Racine, and Paul V. Tollefson, Salem, Wis., assignors to Warwick Electronics Inc., a corporation of Delaware
Filed Sept. 28, 1961, Ser. No. 141,456
7 Claims. (Cl. 324—73)

This invention is concerned with an electronic circuit testing apparatus and more particularly with a testing apparatus for printed circuits, plug-in modules and the like to which connections may readily be made.

A common procedure for testing electronic circuits is to energize the circuits and observe the operation, as by making a plurality of tests which will indicate the nature of the circuit operation. This may require sequential reading of a plurality of meters or other operations. Where the electronic circuits include vacuum tubes, the test procedure requires an initial delay sufficient to allow the tube filaments to warm up.

The present invention provides an electronic circuit testing apparatus in which a simultaneous check is made of a plurality of elements in the circuit, providing an indication of the condition of the circuit in a single operation.

One object of the invention is the provision of such a circuit testing apparatus including a standard or reference circuit having circuit elements, a corresponding circuit to be tested having circuit elements corresponding with the elements of the reference circuit, a source of circuit energizing potential connected with each of the circuits and means for comparing an electrical circuit condition of corresponding circuit elements in the standard and test circuits.

Another object of the invention is the provision of such a system in which a plurality of bridge circuits are formed with one such circuit for each set of corresponding circuit elements, the elements comprising two of the legs of the bridge and wherein the indicating means is connected with the bridge and responsive to a condition of balance thereof.

A further object is that the reference and test circuits include elements having both resistance and reactance and the testing apparatus includes a source of direct current, a source of alternating current, means for sequentially connecting the sources with the reference and test circuits, direct current responsive means for detecting an electrical circuit condition of corresponding elements of the reference and test circuits, alternating current responsive means for detecting an electrical circuit condition of corresponding elements of the reference and test circuits, means for sequentially connecting the direct and alternating current responsive detecting means with the circuit elements and in synchronism with the connection of the circuit elements with the sources, and indicating means connected with and responsive to the detecting means for indicating differences in the detected electrical circuit conditions.

Still another object is the provision of testing apparatus including a standard reference circuit element, a corresponding circuit element to be tested, a power source, means connecting the standard and test elements in a bridge circuit with the power source, and a pair of indicators connected with the bridge circuit and responsive to an unbalance therein, one of the indicators being responsive to an undersize test element and the other being responsive to an oversize test element.

Yet a further object is that in testing resistive elements, a direct current power source is connected with the bridge circuit and a pair of direct current amplifiers are connected across the bridge circuit one responsive to an oversize test element and the other responsive to an undersize test element.

Another object is that where the circuit elements are reactive, the bridge circuit is connected with an alternating current source, and phase sensitive detecting means are utilized for comparing an unbalance signal across the bridge with a reference signal from the source.

Still a further object is the provision of a testing apparatus including a standard reference circuit including resistive and reactive circuit elements, a corresponding circuit to be tested and having corresponding resistive and reactive circuit elements, a direct current source, an alternating current source, a direct current comparison circuit for each set of circuit elements, an alternating current comparison circuit for each set of circuit elements, a direct current error indicator for each pair of elements, an alternating current error indicator for each set of circuit elements, and switch means having a first condition interconnecting the standard and test circuits with the direct current source, the direct current comparison circuit and the direct current error indicator, and a second condition interconnecting the test and standard circuits with the alternating current source, the alternating current comparison circuit, and the alternating current error indicator.

And another feature of the invention is the provision of method of testing electronic circuits, including the provision of a reference circuit, the application of potential to both the standard circuit and a test circuit, and the comparison of a circuit condition of each circuit.

Figure 6:
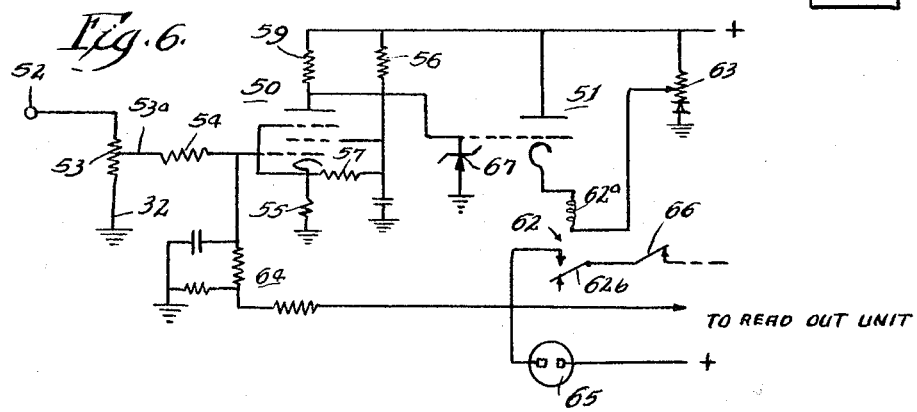
Figure 7:
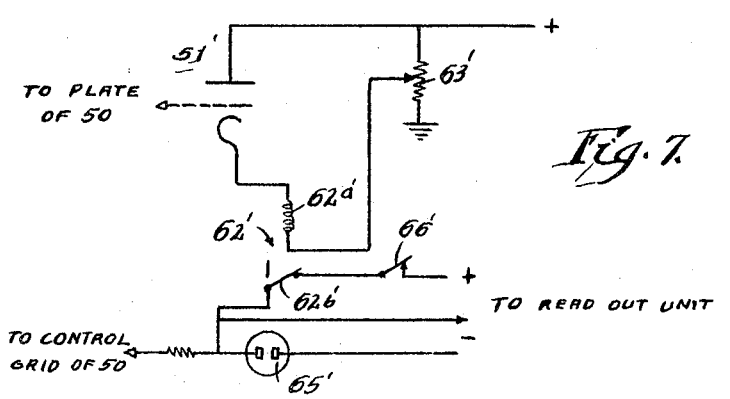
Figure 11:
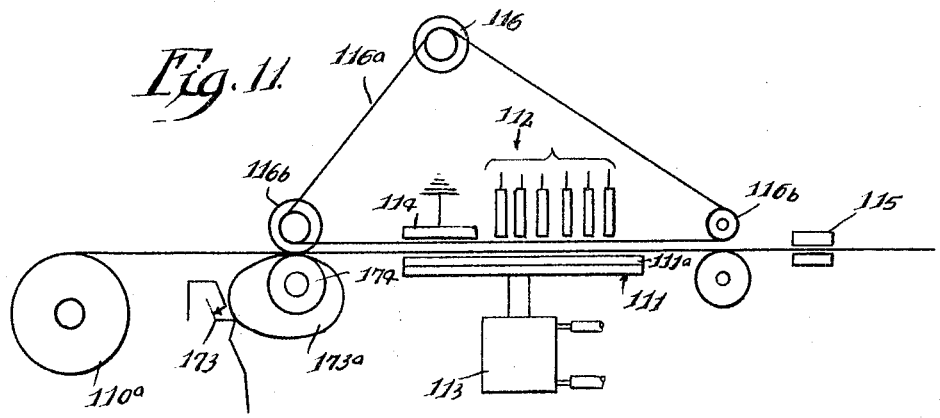
Figure 12:
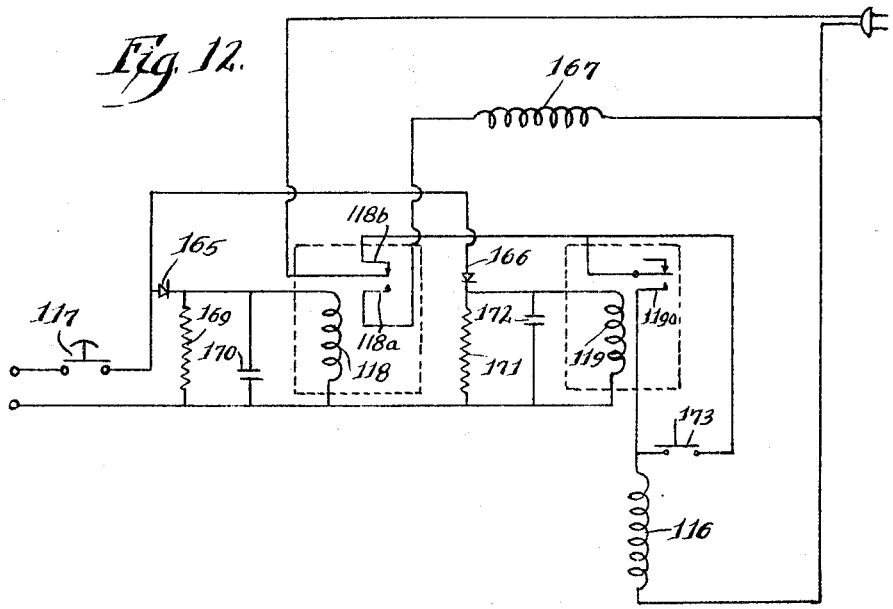
Figure 13:
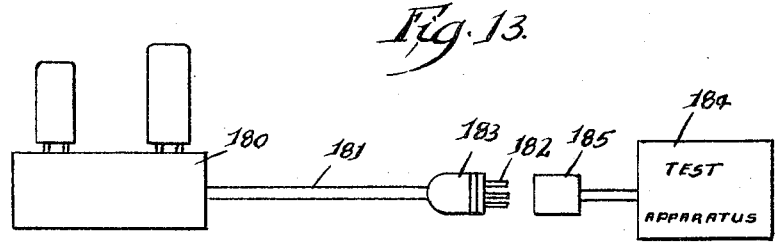

Further objects and advantages will become apparent from the following detailed description taken in connection with the accompanying drawings, in which:

FIGURE 1 is a diagrammatic illustration of a portion of the circuit test apparatus;
FIGURE 2 is a block diagram used in a discussion of the circuit testing apparatus;
FIGURE 3 is a block diagram of a direct current testing circuit for a single circuit element;
FIGURE 4 is a block diagram of an alternating current test circuit for a single circuit element;
FIGURE 5 is a block diagram of a testing system for a circuit having a plurality of elements;
FIGURE 6 is a schematic circuit diagram of a portion of a direct current error detection and indicating circuit
FIGURE 7 is a schematic diagram of a further portion of a direct current error detection and indicating circuit
FIGURE 8 is a schematic diagram of one embodiment of an alternating current error detection circuit;
FIGURE 9 is a schematic diagram of another embodiment of an alternating current error detection circuit;
FIGURE 10 is a schematic diagram of another embodiment of an alternating current detector circuit;
FIGURE 11 is a diagrammatic illustration of a readout unit for providing a record of the test results;
FIGURE 12 is a schematic diagram of a circuit for the readout unit of FIGURE 10;
FIGURE 13 is a diagrammatic illustration of a portion of a modified circuit test apparatus; and
FIGURE 14 is a block diagram of a test control circuit While this invention is susceptible of embodiments in many different forms, there is shown in the drawings and will herein be described in detail an embodiment of the invention with the understanding that the present disclosure is to be considered as an exemplification of the principles of the invention and it is not intended to limit the invention to the embodiment illustrated. The scope of the invention will be pointed out in the appended claims.

Much electronic equipment is manufactured today using printed circuit techniques. In some instances pro duction lines are largely automated with the components being inserted on the circuit board by automatic machines, and the soldering operations carried out entirely automatically. These lines thus minimize the need for manual labor in the production of the electrical circuits. Furthermore, such techniques reduce the time necessary in the assembly of the circuits and in many cases, the circuits may be assembled more rapidly then they may be tested. Sometimes duplicate circuit test setups are required so that several testing operations are carried on at the same time. This requires duplication of test equipment and the labor of several test operators. As pointed out above, present test procedures often utilize normal energization of the circuits and observation of various operating conditions to determine whether the circuit performs properly. This type of testing operation often slows the handling of the circuits and provides a limiting factor on the speed of the production line.

The present invention provides a testing apparatus wherein each of the circuit elements, or selected combinations of elements, of the circuit to be tested is compared with a corresponding circuit element (or combination) in a standard or reference circuit. The testing apparatus is particulaly adapted for use with test circuits where electrical connections may be made readily to each of the circuit elements or combinations of elements to be tested. Printed circuits and modular plug-in units are examples of such circuits. Furthermore, certain tests may readily be made of hand wired circuits using connections to tube sockets for example.

It is believed at present that the testing apparatus disclosed herein will find its principal use in production testing of circuits on rapidly moving assembly lines. However, the multiple circuit, simultaneous comparison technique may be utilized in various other capacities. For example, some of the circuit checks of the lengthy missile countdown procedure might be speeded using comparison testing. Circuit troubleshooting could be simplified to a routine parts changing operation.

Turning now to the drawings, FIGURE 1 illustrates a portion of a printed circuit board 15 having mounted thereon a plurality of electrical circuit elements as resistors 16 and capacitor 17. Similarly, components such as inductors and the like may also be mounted on the circuit board. A tube socket 18 has a tube 19 inserted therein. The circuit board 15 is of an insulating material, in accordance with the usual practice, and conductive areas 20 are affixed to the undersurface thereof. The terminals of the various circuit components 16 and 17 are electrically secured thereto as by soldering.

For the purpose of electrical testing, the circuit board 15 with the various circuit elements mounted thereon is placed in a suitable jig or frame which is provided with a plurality of electrical contact members 23 which make electrical contact with each of the conductive areas of the undersurface of board 15. In accordance with the present invention, a pair of such test jigs are provided, with a standard or reference circuit mounted in one and the circuit to be tested placed in the other so that similar electrical connections are made to the various circuit elements of each circuit.

FIGURE 2 illustrates the basic principle of the circuit testing apparatus. A comparison circuit 25 is provided which includes both the circuit element to be tested and the standard or reference circuit element. The comparison circuit is connected with a potential source 26 and a detector circuit 27 senses any difference in a circuit condition between the standard or reference element and the element being tested. A suitable indicator 28 is connected with the detector circuit and may be designed to indicate either the nature an error in circuit element value or, if desired, that the circuit elements are of the proper size. Thus, with the testing apparatus of this invention, the standard and a nominally identical test circuit element are both subjected to a potential and a suitable circuit condition is compared, providing an indication of the value of the circuit element being tested. It is not necessary that the test circuit be operated or subjected to normal operating potentials.

In FIGURE 3, an embodiment of the invention utilized in testing the resistance of circuit elements is illustrated. A direct current source 30 has connected therewith a bridge circuit 31, including a pair of matched resistors $R_A$ and $R_B$ connected across the source and having their juncture connected to a reference potential or ground 32. Bridge circuit 31 is completed by the reference component $R_S$ and the test component $R_T$. A detector circuit 32 is connected with the juncture between resistors $R_S$ and $R_T$, and with ground, sensing the unbalance output signal across the bridge. An indicator 33 is connected with detector circuit 32 for indicating the nature of the test circuit element $R_T$, i.e., whether it is of the correct value, too large or too small. Indicator 33 may take the form of lights or other physical signals, or may include an apparatus for recording the necessary information regarding the test circuit. The matched resistors $R_A$ and $R_B$ may, if desired, form a part of the direct current source 30 (as the internal impedance thereof), in which event the source has a balanced output with respect to a reference potential and the detector circuit is connected to this reference potential. A pair of matched batteries are preferred for accurate test work.

FIGURE 4 illustrates a similar testing circuit for reactive circuit elements. An alternating current source 35 has an output including two signals $\phi_A$ and $\phi_B$, 180° out of phase with each other, and balanced with respect to ground 32. The standard circuit component $Z_S$ and the nominally identical test element $Z_T$ are connected across the two phase signals forming a bridge circuit with the source. An alternating current detector 37 is connected with the juncture of the reference and test elements $Z_S$ and $Z_T$. The phase signals $\phi_A$ and $\phi_B$ are also connected to detector 37, providing a reference signal, so a determination may be made whether the test element is over size or under size. In the case of alternating current tests of reactive elements, the magnitude of an error potential is representative of the magnitude of error of a circuit element, while the phase of the error signal indicates whether the element in question is over size or under size. An indicator 38 is connected with detector 37, and may include physical signals or automatic recording apparatus.

FIGURE 5 illustrates a portion of a composite testing apparatus for simultaneously comparing a plurality of circuit elements. A source 40 provides a balanced output across which is connected a plurality of pairs or sets of corresponding circuit elements. Each set of circuit elements 41, 41a and 41b includes a standard or reference element, as 42, and a nominally identical test element, as 42a. The juncture of the two elements, which are connected in series across the balanced outputs of the source 40, is connected with a pair of detector circuits 43 and 44, for detecting high value and low value element conditions, respectively. Connected with each of the detector circuits is a suitable indicator 45 and 46. Furthermore, each of the detector circuits 43 and 44 is connected with a simultaneous readout unit 47 which may provide a permanent record of the test. Two testing circuits as shown in FIGURE 5 are utilized, one for the direct current and the other for the alternating current test.

Similar high and low detector circuits, 43a, 44a, 43b and 44b are connected with the balanced comparison circuits 41a and 41b, respectively. Indicators 45a, 46a, 45b, and 46b are also connected with the detector circuits. With this testing arrangement each of the sets of circuit elements are energized simultaneously from source 40 and the various detectors and indicators are simultaneously actuated, providing an indication of the condition of the circuit being tested. As pointed out above, where the circuit is in printed form, the board may readily be placed in a jig or frame through which contact is made to the conductive areas on the board. Thus, in order to test the elements of the circuit, it is necessary merely that the circuit board to be tested be placed in the support and the elements thereof be energized in comparison circuits with the standard circuit elements, from the source 40. A simultaneous indication is provided of the condition of each of the circuit elements, and a permanent record may be made of the test. A pair of such tests, one utilizing direct current and the other alternating current provides a complete check of the resistive and reactive elements of the circuit. A suitable control circuit for effecting the sequential circuit testing operation will be described in detail below.

During the course of the following description a specific circuit will be described and values and component types given for the circuit elements. It is to be understood that this specific disclosure is intended merely to illustrate an operative embodiment of the invention, and many changes and modifications will be apparent.

Turning now to FIGURE 6, the schematic circuit diagram for a direct current amplifier serving as a detector is shown. The amplifier includes a pentode stage 50, and a triode stage 51, as the two sections of a 6U8, for example. An input terminal 52 is connected with the bridge comparison circuit, as at the juncture between $R_S$ and $R_T$ in FIGURE 3. A potentiometer 53 is from terminal 52 to ground 32, and the adjustable tap 53a is connected through an isolating resistor 54, 470,000 ohms, with the control grid of amplifier 50. The cathode of amplifier 50 is returned to ground through resistor 55, 820 ohms, which is connected with a fixed positive bias through a voltage divider including resistor 56, 39,000 ohms, and resistor 57, 22,000 ohms, connected across the positive supply. The plate of the pentode is connected through load resistor 59, 470,000 ohms, with the positive supply, while the screen grid is connected to the juncture between resistors 56 and 57.

The amplified output of pentode 50 is direct coupled to the control grid of triode section 51, the plate of which is connected with the positive supply. The cathode of the triode section is returned through the operating coil 62a of a relay 62 to the movable tap of a potentiometer 63, 60,000 ohms, connected across the B supply. The contacts associated with the relay 62 form a portion of the indicator circuit, as will appear.

With a balanced D.C. comparison circuit of the nature illustrated in FIGURE 3, the polarity of the unbalance potential of the comparison circuit indicates the nature of the error in the circuit component, a positive potential indicating an error in one direction and a negative potential indicating an error in the other. The magnitude of the error potential is related to the magnitude of the error or mismatch of the circuit elements. The circuit of FIGURE 6 is arranged to be actuated by a negative error potential from the bridge circuit. A negative signal at terminal 52 decreases the conduction through pentode 50 resulting an increase in the potential applied to the control grid of triode 51. The triode stage 51 is initially adjusted for insufficient conduction to energize relay 62, so that as conduction increases the relay becomes energized. Upon energization contacts 62b close. Contact 62b completes a circuit connecting a neon indicator 65 across the entire output of the direct current supply, energizing the neon indicator and providing a visual indication of an error in the circuit being tested. At the same time, a negative potential is applied through a switching network 64 to the control grid of pentode 50, cutting it off and holding the detection circuit in the actuated condition until reset switch 66 is opened. Zener diode 67 limits the potential at the grid of triode 51, preventing excessive current through relay coil 62a.

The energizing potential for neon indicator 65 is connected with the readout unit and may be utilized as described below to provide a record of incorrect components.

As pointed out above, potentiometer 63 is adjusted to the threshold of operation for the system, with the relay current just below the energization point. Potentiometer 53 adjusts the sensitivity of the circuit, establishing the amplitude of error potential necessary to cause operation of the detector. This permits set up of the test apparatus for any desired tolerance in the circuit elements.

As the single detector circuit is responsive only to either an oversize or undersize element, a pair of such circuits are necessary for each set of standard and test circuit elements which are to be compared. Basically, the two circuits are identical, and FIGURE 7 illustrates the changes which are necessary in the relay circuit. The triode section 51' has its plate connected with the positive supply and its cathode returned through the operating coil 62a' of relay 62' to the tap of potentiometer 63'. In this circuit however the tap of potentiometer 63' is so adjusted that sufficient current flows through triode 51' to energize relay 62' in the absence of an error signal. A positive error signal at the output of the comparison circuit is applied to the pentode amplifier and as this positive signal increases in amplitude, with an incorrect circuit element, the pentode conducts more heavily and the potential applied to the control grid of the triode decreases in amplitude. At a desired error signal level, the conduction of triode 51' falls below the level necessary to maintain relay 62' energized and the relays drops out. Contact 62b' closes completing a circuit from the positive terminal of the balanced power supply energizing the neon bulb 65'. A positive signal is also applied to the control grid of pentode 50' holding it in a state of high conduction and maintaining the actuated state of the indicator circuit until reset switch 66' is opened.

Two direct current amplifier circuits are used for each of the D.C. comparison circuits, one providing a high value detector and the other a low value detector for the various elements of the circuit being tested.

In an alternating current check of reactive circuit components, the unbalance or error signal with an incorrect component in the test circuit has a shift in phase from the applied potential indicating the nature of the error i.e., overvalue or undervalue component, and an amplitude representing the magnitude of the mismatch. Accordingly, in order to provide a suitable indication of the nature of the error in the size of the component it is necessary to utilize a phase sensitive detector.

One such detector is shown in FIGURE 8, utilizing a type 6AS6 pentode 69. A phase signal, as $\phi_A$ or $\phi_B$, is applied through isolating resistor 70, 470,000 ohms, to the suppressor grid of the detector while the error signal from the comparison circuit is applied through resistor 71, 470,000 ohms, to the control grid of the detector. The control grid is returned to ground through resistor 72, 18 megohms. The cathode of the detector is connected to the movable tap of potentiometer 73, 60,000 ohms, connected in series with resistor 74, 1 megohm, across the B supply, 150 volts. The cathode circuit is bypassed ground through capacitor 75, 10 μf. The anode of the detector tube is connected through a load resistor 76, 330,000 ohms, with the B supply. The screen grid is connected to a positive potential provided by a voltage divider including resistor 77, 390,000 ohms, and resistor 78, 100,000 ohms connected across the B supply, with the screen grid bypassed ground through capacitor 79, 0.01 μf.

Resistor 73 is adjusted in the absence of an error signal and with a phase signal of the order of 10 volts peak-to peak, so that the tube is nearly at cutoff. When an error signal in phase with the phase or reference signal is present the detector will conduct at a level dependent on the magnitude of the error signal. With an error signal out of phase with the reference signal, there is little conduction through the tube. The A.C. output of the synchronous detector is coupled through capacitor 80, 0.1 μf., with a voltage doubler circuit including rectifiers 81 and 82. The rectifier output of the voltage doubler is filtered in a network including shunt capacitors 83, 0.1 μf. and 84, 0.01 μf., and series resistor 85, 100,000 ohms.

The output of the filter network is essentially a positive D.C. signal in the presence of an error signal at the control grid of the detector. A suitable direct current detector circuit, responsive to a positive signal, as the circuit of FIGURES 6 and 7, may be connected with the output of the filter to provide the desired unbalance indication. In a system which is responsive to both oversize and undersize components, two synchronous detectors of the type shown in FIGURE 8 are required. One is energized by reference phase signal $\phi_A$ from the alternating current source while the other is energized by phase signal $\phi_B$. Both synchronous detectors, of course, require a direct current detector-indicator circuit as pointed out above.

An alternate form of synchronous detector is illustrated in FIGURE 9. A triode amplifier 90 has the error signal from the balanced comparison circuit connected with the control grid thereof. The control grid is returned through resistor 91, 10 megohms, to ground. The cathode of the amplifier is connected with ground through a resistor 92, 10,000 ohms, bypassed with a capacitor 93, 10 μf. The plate of the triode is connected through load resistor 94, 18,000 ohms, with the positive B supply. A by-pass capacitor 95, 0.01 μf., is connected to ground from the plate circuit. The amplified output of triode 90 is connected through coupling capacitor 96, 0.01 μf., with a balanced phase detecting circuit including diodes 97 and 98, as type 1N461 silicon diodes. The two phase signals $\phi_A$ and $\phi_B$ are supplied from the alternating current source 15 (FIGURE 4) through coupling capacitors 99 and 100, each 0.01 μf., to the balanced phase detector. A potentiometer 101, 1 megohm, is connected across the detector and has its tap returned to ground for balancing the circuit.

In the presence of an error signal one or the other of diodes 97 and 98 will conduct depending upon the phase of the error signal, and a pulsating D.C. current will be present at the point 104, having a polarity determined by the nature of the error signal. The pulsating direct current is filtered by series resistor 105, 100,000 ohms and shunt capacitor 106, 0.01 μf., and a D.C. control potential appears at output terminal 107. A pair of direct current error detector circuits, as the circuits of FIGURES 6 and 7, may be connected with the output of the phase detector (FIGURE 9) to provide the desired error indication. In this case, of course, only a single phase detector is necessary.

Under certain conditions the circuit of FIGURE 9 may be ineffective, as where sensing an open circuit or short circuit condition. With this type of circuit fault, there may be no voltage differential across one of the detectors while the voltage across the other is in the reverse direction and the circuit has no output. This might not be too serious where the short circuit or open circuit error could be located by the direct current portion of the test. However, this is not always possible. Accordingly, a more sophisticated phase detector circuit may be utilized, as shown in FIGURE 10. The alternating current error signal is coupled through capacitor 50, 0.001 μf., to the first stage 151 of an amplifier. The output of amplifier 151 is coupled to the input of a balanced phase splitter 152 having cathode and plate load resistors 153 and 154, respectively, matched 18,000 ohms resistors. The output of phase splitter 152 is connected with a bridge detector circuit 155, to which the phase signals $\phi_A$ and $\phi_B$ from the signal source are also applied. Each leg of the bridge detector circuit includes a diode 156 connected in series with capacitor 157, 0.02 μf. The capacitor junctions are connected with the output of phase splitter 152, while the reference phase voltages are applied to the junctures between the diodes. A balanced resistive network is connected across the capacitors of the bridge and includes potentiometer 158, 1 megohm, connected across the two series connected capacitors 157 and 157a. A pair of matched resistors 159 and 160, each 470,000 ohms, are connected across capacitors 157b and 157c. The tap of potentiometer 158 is connected with the juncture between resistors 159 and 160, and at this point the output of the phase detector appears. This output is filtered through circuit 161, and the direct current error signal appears at terminal 162.

In a complete detection system for a circuit having a plurality of elements, including resistive and reactive elements, a plurality of direct current and alternating current error detectors are required, as illustrated in FIGURE 5. The particular number and arrangement of these elements depends on the nature of the circuit being tested. In general, there will be an overvalue and undervalue detection and indicating means for the direct current test of each element, and an overvalue and undervalue detection and indicating means for the alternating current test for each of the reactive circuit elements.

In addition to the visual indication of a component of the incorrect value provided by neon bulbs 65 and 65', it is desirable to provide a permanent record of the incorrect components which, for example, may be attached to the chassis or board of the test circuit to indicate the replacements required. FIGURE 11 illustrates diagrammatically such a readout circuit. A sensitized paper 110 is provided from a supply roll 110a and extends across a supporting base or platen 111. The paper 110 is sensitive to the application of an electrical potential to character elements or electrodes 112, the lower surfaces of which are formed with desired indicia, as numerals. The readout electrodes 112 are connected with the neon indicator circuits of the various detectors, from which a suitable marking potential is derived upon the occurrence of an incorrect component. Upon completion of the alternating current and direct current tests, if one of the neon indicators is lighted showing that an incorrect component is present, the operator causes actuation of an air cylinder 113 which moves base 111 upwardly to bring the sensitized paper 110 into contact with the indicia bearing faces of electrodes 112 and a ground plate 114. The base 111 has a resilient surface 111a which holds the paper against the electrodes with sufficient force to cause the appearance of the indicia on the paper. The base 111 is then released and a drive mechanism actuated to move the paper 110 through the readout unit, whereupon the marked portion of the paper may be torn off against a cutter 115. The paper drive includes a motor 116 connected through a belt 116a with a pair of drive rollers 116b.

FIGURE 12 shows a schematic diagram for controlling the operation of the readout unit. Upon completion of the two portions of the test procedure, if an error is indicated, the operator momentarily closes switch 117 energizing relays 118 and 119, through diodes 165 and 166, respectively. Contact 118a associated with relay 118 closes connecting the coil of an air switch 167 with a suitable source of operating potential. Air switch 167 controls the air supply to pneumatic piston 113, moving the platen 111 upwardly to hold the paper 110 against the indicia bearing surfaces of electrodes 112. The closing of contact 119a associated with relay 119 has no immediate effect.

A time delay network is connected with each of the relays and serves to hold the relays in energized condition after release of switch 117. The time relay network for relay 118 includes a resistor 169, 1500 ohms and a capacitor 170, 200 μf. The time delay network for relay 119 includes resistor 171, 4700 ohms, and capacitor 172, 200 μf. Relay 118 will drop out first, whereupon contact 118a opens and the platen 111 is retracted. Contact 118b closes completing an energizing circuit through contact 119a for drive motor 116. A holding circuit for the drive motor is provided through switch 173 which is operated by a cam 173a mounted on backup roller 174, associated with one of the drive rollers 116b. The initial movement of cam 173a closes switch 173 and it remains closed through a full revolution of the cam. The timing relationships of the drive are selected to feed a sufficient length of paper through the unit to carry a complete indication of the component indicia.

It was pointed out in the introductory portion of the specification that the present invention is not limited to use with printed circuits, but may provide for testing of many types of circuits and is particularly useful in testing circuits where connections may readily be made to selected circuit elements. FIGURE 13 illustrates such an arrangement where a test unit 180 has connected therewith a cable 181 containing conductors connected at appropriate points in the circuit for testing various elements or combinations thereof. The conductors terminate in the prongs 182 of a plug 183. The test apparatus 184 is provided with a suitable socket 185 to which plug 183 may be connected.

FIGURE 14 illustrates a control circuit for effecting the sequential direct current and alternating current tests of a test circuit. The test apparatus is shown for one circuit element which is subjected to both direct current and alternating current tests. The apparatus includes the reference circuit 120, test circuit 121, an alternating current detector 122 having a pair of direct current detectors 123 and 124 connected therewith, and a pair of direct current detectors 125 and 126, used in the direct current portion of the testing operation. Each of the detectors has connected therewith an indicator 127–130. The indicators may, for example, be the neon indicators 65 and 65' of FIGURES 6 and 7. The apparatus includes a direct current source 30, an alternating current source 35, an operating relay potential supply 132 and an indicator potential supply 133. The desired interconnection of the test potential sources and the reference and test circuits and the detectors are made through the contacts of a plurality of control relays 135a, 135b, 135c, and 135d. The relays in turn are under the control of a manual A.C.-D.C. switch 136. In the condition of the circuit shown in FIGURE 10, switch 136a in the circuits of the control relays is open and the relays are not energized, the respective contacts 135a–1, 135b–1, 135c–1 and 135d–1 being closed as shown. In this condition of the circuit, phase $\phi_A$ of the alternating current source 135 is connected through relay contact 135a–1 with reference circuit 120 while $\phi_B$ is connected through contact 135c–1 with the test circuit. The reference and the test circuits are connected together and with the alternating current detector 122 through contacts 135b–1 and 135d–1.

The indicator circuits include a pair of relays 138 and 139 which are actuated through section 136b of the control switch and normally closed reset switch 140 from the positive output of indicator supply 133. Reset switch 140 may be located for actuation by the test circuit board 15, as shown in FIGURE 1. The switch is closed when a board is in the test position, and opens on removal of the board following the tests. In the position of switch 136 shown in the drawing, switch section 136b connects the positive output of indicator supply 133 with alternating current indicator control relay 138. With reset switch 140 closed, relay 138 is energized closing contacts 138a and 138b applying positive and negative potentials to detector circuits 123 and 124 and applying a holding potential to the relay through diode 138c. The positive and negative potentials provide the energization for indicators 127 and 128 and the holding potential for actuated detectors as described in connection with FIGURES 6 and 7. A time delay network is incorporated in the energization circuit for control relay 138, to prevent premature energization of the detectors and indicators, before the reference and test circuits are properly situated and suitable connections may be made with the test potential sources and the comparison circuits. For this purpose, a variable resistor 142 is connected in series with the coil of relay 138, while a capacitor 143 is connected in parallel with the relay coil. The time constant of the circuit of resistor 142 and capacitor 143 is made appreciable, as of the order of several seconds, to provide the necessary delay in energizing the relay.

After the alternating current test is completed, control switch 136 is operated closing contact 136a–1 and energizing relays 135a through 135d. This connects the reference and test circuits with the positive and the negative terminals of direct current source 30 through contacts 135a–2 and 135c–2. Similarly, contacts 135b–2 and 135d–2 interconnect the reference and test circuits 120 and 121 with D.C. detectors 125 and 126. Contact 136b–2 is closed connecting the positive terminal of indicator supply 133 with the operating coil of direct current indicator control relay 139, through a time delay network including resistor 144 and capacitor 145. Contacts 139a and 139b close following the time expiration of the desired time delay and apply the necessary positive and negative potentials to the detector circuits 129 and 130. A holding circuit is completed through diode 139c.

The holding circuits for relays 138 and 139 include diode elements 138c and 139c, which prevent interaction between the detector and relay circuits. Without the diodes, the energizing potential for the relays from switch 136b would be applied prematurely to the detectors, and might result in a false indication.

Similar circuitry and switching is provided for the other elements of the reference and test circuits. The alternating and direct current test potentials are available at terminals A and B and are connected directly with the further circuit elements. Further relay contacts associated with relays 135b and 135d may be provided for the interconnection of the reference and test circuits with the detectors, or if necessary additional relays for this purpose may be connected with terminals C and D. The indicator operating potentials available at terminals E, F, G, and H, for the indicators associated with further circuit elements. The alternating and direct current tests are sequentially performed with similar tests of each circuit element being made simultaneously. The order of the direct and alternating tests is unimportant.

We claim:

1. An electronic circuit testing apparatus for simultaneous testing of a plurality of interconnected circuit elements, comprising: a reference circuit having a plurality of interconnected circuit elements; a circuit to be tested having a corresponding plurality of nominally identical interconnected circuit elements; a source of circuit energizing potential having a pair of outputs balanced with respect to a reference potential and having connected thereacross a plurality of pairs of said nominally equal, series connected reference and test elements, the reference element of each pair being connected with one source output and the test element of each pair being connected with the other source output, the sense and magnitude of the unbalance potential at the junction of each pair of reference and test elements, with respect to said reference potential, indicating the sense and magnitude, respectively, of a difference in value between the associated reference and test elements; a plurality of bidirectional detector means, one for each pair of reference and test elements, each detector means being connected between the junction of one of said plurality of pairs of elements and said reference potential, each detector means isolating the associated pair of reference and test elements from the other pairs of reference and test elements, and each detector means including a pair of direct current detectors, one responsive to one sense of unbalance potential and the other responsive to the other sense of unbalance potential for detecting test elements which deviate from the corresponding reference elements in either direction, each detector having a threshold operating level and detecting the presence of an unbalance potential of the appropriate sense and in excess of said threshold level and wherein each detector has a fixed conductivity state in the absence of an unbalanced potential and each changes its conductivity state on the occurrence of an unbalance potential in excess of the threshold level thereof; and means connected with each detector and responsive to a change of state of the associated detector for indicating the occurrence of an unbalance potential in excess of the threshold level of the detector.

2. The circuit testing apparatus of claim 1 wherein said indicating means includes holding means responsive to the occurrence of an indication of an unbalance potential in excess of the threshold level for said detector for maintaining the unbalance indication upon removal of the unbalance potential from the detector.

3. The circuit testing apparatus of claim 2 wherein each detector is a direct current amplifier, one detector of each detector means being conductive and the other being non-conductive in the absence of an unbalance potential, each detector including a circuit completed on a change of state thereof for applying a holding potential thereto to maintain the change of state indication thereof.

4. The circuit testing apparatus of claim 1 for testing the resistance of a plurality of interconnected circuit elements wherein said source of circuit energizing potential is a direct current source and each detector means includes a pair of direct current amplifiers direct current connected with each junction.

5. The circuit testing apparatus of claim 1 for testing the reactance of a plurality of interconnected circuit elements wherein said source of circuit energizing potential is an alternating source having a pair of outputs 180° out of phase with each other balanced with respect to said reference potential and each detector means includes a phase sensitive detector responsive to said reference outputs and to the unbalance signal at said junction and having a direct current output, the polarity and amplitude of which represent the sense and magnitude of a difference in value between the associated reference and test elements, and in which the pair of detectors are direct current detectors connected with the output of said phase sensitive detector.

6. The circuit testing apparatus of claim 1 having a first source of direct current circuit energizing potential and a plurality of direct current detector means, a second source of alternating current energizing potential and a plurality of alternating current detector means, and control switch means having a first condition in which said first source and direct current detector means are connected with said reference and test circuit elements, and a second condition in which said second source and said alternating current detector means are connected with said reference and test elements.

7. The circuit testing apparatus of claim 6 including time delay means responsive to said control switch means delaying the actuation of said indicator means after the connection of said sources and detectors with said circuit elements.

References Cited by the Examiner
UNITED STATES PATENTS

| | | | |
|---|---|---|---|
| 2,479,051 | 8/1949 | Sunstein | 324—57 |
| 2,686,293 | 8/1954 | Davis | 324—62 |
| 2,791,746 | 5/1957 | Bowersox | 324—113 |
| 2,892,133 | 6/1959 | Huge | 317—141 |
| 2,925,591 | 2/1960 | Burkhart. | |
| 2,950,437 | 8/1960 | Stahl | 324—73 |
| 2,968,031 | 1/1961 | Higa | 324—83 X |
| 2,977,535 | 3/1961 | O'Connor et al. | 324—73 |
| 3,034,051 | 5/1962 | Higgins | 324—73 |
| 3,039,604 | 6/1962 | Bickel | 324—158 X |
| 3,049,649 | 8/1962 | Burke et al. | 317—141 |
| 3,059,215 | 10/1962 | Proskauer | 324—73 X |
| 3,065,414 | 11/1962 | Sears | 324—73 X |
| 3,090,913 | 5/1963 | Boyer | 324—83 X |
| 3,156,864 | 11/1964 | Shaw | 324—51 X |
| 3,182,253 | 5/1965 | Dorsch | 324—73 X |

WALTER L. CARLSON, *Primary Examiner.*

G. S. KINDNESS, E. L. STOLARUN,
*Assistant Examiners.*